July 26, 1960 S. LOEWE ET AL 2,946,859

MAGNETIC RECORDING HEADS

Filed Sept. 10, 1956

Inventors:
Siegmund Loewe
Werner Loewe

United States Patent Office 2,946,859
Patented July 26, 1960

2,946,859

MAGNETIC RECORDING HEADS

Siegmund Loewe, 68 Ridge Road, Yonkers 5, N.Y., and Werner Zorn, Schillerstrasse 5, Berlin-Zehlendorf-West, Germany Filed Sept. 10, 1956, Ser. No. 609,042

Claims priority, application Germany Sept. 14, 1955

2 Claims. (Cl. 179—100.2)

Figure 1:
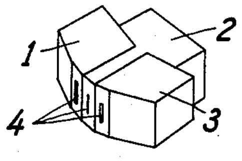

The invention refers to a novel arrangement of magnetic recording heads which is especially advantageous for high quality magnetic sound recorders. Magnetic tape recorders for sound recording or reproduction are always provided with an erasing head as well as with a recording or reproduction magnetic head. The two last-named heads are also often combined into one single head. With the recorders of this type, up to now in use, the erasing head, on the one hand, and the recording and reproduction head, on the other hand, have been arranged at various spots along the tape so that there is always a distance of several centimetres between the two heads. In normal single-track or also in multi-track tapes, this distance between the erasing head and the recording or reproduction head is of no importance for the operation; here, then, in the arrangement and the distance of the various magnetic heads with respect to each other, the purely constructional point of view can be dominant.

It is basically different with those magnetic tape recorders at which the direction of the tape is automatically switched over when the end of the tape is reached and, as the case may be, the sequence of the two magnetic heads. These recorders are especially suited for high quality recording and reproduction of musical recitals. If the usual arrangement of erasing head and recording and reproduction head is used in these recorders whereby there is a noticeable distance between the two magnetic heads, it is inevitable that a small portion of the sound track will remain unerased each time a switch-over is made so that, on reproduction, an undesirable acoustical disturbance will occur at this position.

By means of the present invention, this disadvantage is avoided in that the magnetic heads are arranged in such a way that the operational gaps for recording or reproduction, on the one hand, and for erasing, on the other hand, are arranged as close as possible to each other, with the smallest possible space between, of e.g. one or a few millimetres. The idea of this invention is, in particular, practically realized in that the separate heads, in a plane vertical to the direction of the gaps, are kept narrower at the place of the gap than at the end away from the gap. Thus, for example, the separate heads can be formed in the shape of sectors or triangles with the gaps lying on their preferably slightly flattened or rounded points and the adjacent side-edges adjoining on each other in such a way that there is more or less no space between them.

Another way of carrying out the idea of the invention is, for example, to incline the planes, lying, in the main, vertical to the operational gaps, of the separate magnetic heads, closely adjacent to each other, in a converging manner so that, for example, the control coil, situated on the core of one head, lies in a different plane to the control coil or coils of the other head or heads of this arrangement.

The invention can, in particular, be applied to those head arrangements in which the sequence of the heads is dependent on the respective direction of the tape, e.g. in an automatic manner. In this connection, it is possible to combine, for example, three somewhat sector-shaped magnetic heads, the middle one being a combined recording and reproduction head, whilst the two outer ones are erasing heads.

The special form of such a combined head arrangement makes it possible to arrange the combined magnetic head so that it rotates around an axle which is provided parallel to the gap direction but at a spot which is situated as far as possible from the head arrangement. With a corresponding rounding of the core poles in contact with the tape, it is then possible to attain the arrangement whereby, according to the running direction of the tape, an erasing gap always lies before the combined recording and reproduction gap.

The principle of the invention as also details are explained in detail in the appended diagram.

Figures 1–10 as a whole represent examples for magnetic head arrangements of one or more separate heads, partly of the kind where a recording and reproduction head is flanked by two erasing heads.

Fig. 1 shows an example of a magnetic head arrangement whereby, owing to a specially narrow form of the central system 2, situated between the two other head systems 1 and 3, towards the gap side, it is possible to arrange the gaps 4 close to each other. The whole system is rounded, on the gap side, at the surface in contact with the tape. The two outer heads 1 and 3 are, for example, erasing heads, the center system 2, on the other hand, acts as combined recording and reproduction head.

The whole magnetic head arrangement according to Fig. 1 is stationary and, by means of electrical switching over, the magnetic heads can be put in operation as desired, according to the respective running direction of the tape. If, as previously mentioned, the two outer heads 1 and 3 are erasing heads and the center head 2 is a combination head for recording and reproduction, then the switching is so arranged that, at each time, only one of the two outer heads is in operation at the same time as the centre head system.

Figure 2:
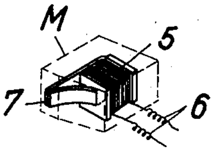
Figure 3:
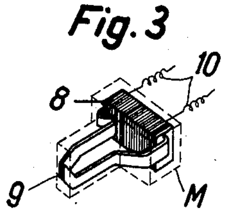

Figs. 2 and 3 show the construction of the single systems of the arrangement presented in Fig. 1. The separate magnetic systems 5 and 8 are imbedded in non-magnetic material, in particular, e.g. insulation material or plastic M and adapted to the outer form of the whole system. Thus, in the system shown in Fig. 2, the coil axle of the magnetic system 5 runs from the front to the back, whilst in the combination head system, shown in Fig. 3, the coil axle of the magnetic system 8 runs transversally to the gap 9. The gap in Fig. 2 is designated with 7. The electrical leads in Fig. 2 are designated with 6, in Fig. 3 with 10. Owing to the arrangement of the magnetic system corresponding to the purpose of the invention, the narrow front part with the gap 9 results, as according to Fig. 3, which is enclosed by the two erasing head systems, as can be clearly seen in Fig. 1.

Figure 4:
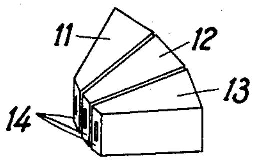

Fig. 4 shows a wedge-shaped form of the single magnetic head systems 11, 12, and 13 with the appertaining gaps 14 along which the sound tape—not shown—moves. Here too, the two outer systems are usually used as erasing heads when the tape is used for running in both directions.

Figure 5:
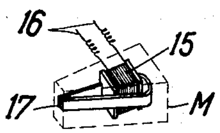

The appertaining Fig. 5 shows the embedding of the magnetic system 15 with gap 17 in the insulation or plastic material M which has a wedge-shaped outer form. 16 are the electrical leads.

Figure 6:
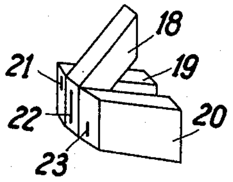

In Fig. 6, the gaps 21, 22, and 23 are also closely adjacent to each other, however, the parts of the separate heads 18, 19, and 20 away from the slits are arranged in planes inclined to each other. Consequently, the head system 18 is tilted upwards with its rear part so that the separate systems will not disturb each other. Thus there is sufficient space for widening out the rear part of the head with the magnetic coils. In this example, the two outer gaps 21 and 23, which preferably operate as erasing gaps, are shifted, vertically to the running direction of the tape, by half the width of the tape. This arrangement is designed for a dual-track tape, the erasing slit 21 being used for the upper track, the erasing slit 23 for the lower track and the center slit 22, provided for recording and reproduction, for both tracks.

Figure 7:
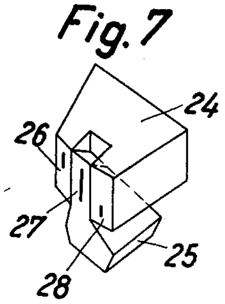

In the example represented in Fig. 7, the rear parts of the separate head systems are also so formed that they cannot disturb each other, being arranged in planes, displaced with respect to each other. These parts are designated with 24 and 25. 26, 27, and 28 are again the three gaps which are arranged in the same manner as in Fig. 6.

Figure 8:
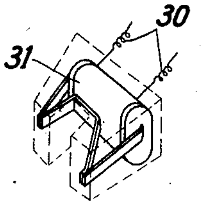

In this example, a still further simplification is made in that the two erasing head systems are combined to form a common magnetic system 31, as shown in Fig. 8. 30 are the electrical leads.

Figure 9:
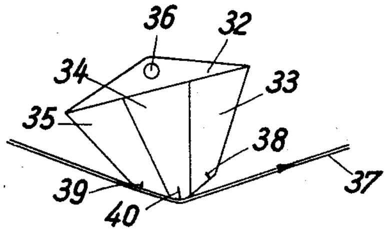
Figure 10:
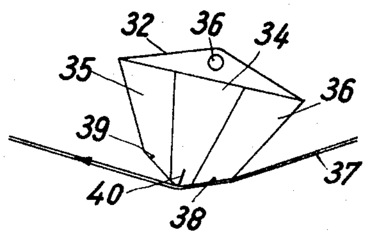

In Figs. 9 and 10, a further example for the magnetic head arrangement is shown, in accordance with the invention. Here, the magnetic head systems 33, 34, and 35 are combined to form a mechanical unit and can be rotated around the pivot 36. The single gaps are designated with 38, 39, and 40; 38 and 39 acting as erasing slits. In accordance with the respective running direction of the tape—the tape is designated as 37—shown on both figures by the direction of the arrow, the whole combination system is rotated around the pivot 36 in the running direction of the tape so that the correct gaps are always automatically in contact with the tape. According to Fig. 9, the tape runs straight from left to right and the head system is rotated to the right around the pivot 36 by movement of the tape so that the gaps 39 and 40 are in contact with the tape in this sequence. First in the running direction of the tape is the erasing gap 39 and then the recording and reproduction gap 40 which is quite as it should be, so that the arrangement can operate correctly; should the running direction of the tape now be reversed into the opposite direction, i.e. from right to left, as shown in Fig. 10, then the head system is automatically rotated to the left around the axle 36 by the tape movement and now the gaps 38 and 40 are in contact with the tape for operation. Again, in the running direction of the tape, the erasing gap 38 comes first into action and then the recording and reproduction gap 40 so that, in this running direction of the tape, too, the correct sequence of the magnetic head gaps is secured automatically.

Thus, the present invention describes various types of magnetic head arrangements which are particularly of advantage for high quality magnetic sound recorders with regard to the gap arrangement since, with these recorders, it is important that the gaps of the single magnetic head systems are arranged as close as possible to each other.

What we claim is:

1. In a magnetic tape recording arrangement an electromagnetic head assembly having a substantially smaller surface at its gap side than its opposite side comprising a recording-reproducing head and two erasing heads, an axis mounting the head assembly to turn within its horizontal plane, said recording-reproducing head being arranged between said two erasing heads, each of said heads being trapezio-shaped in its horizontal cross-section and substantially smaller at its gap side than the opposite side, each of said heads further forming a separate magnetic circuit embedded in non-magnetic material and being arranged closely adjacent one another in horizontal direction thus forming a mechanical unit which is adapted to turn round said axis into the running direction of the tape and to touch the tape with the gap side only of said recording-reproducing head and one of said erasing heads.

2. An electromagnetic head assembly as claimed in claim 1, wherein the gaps of said erasing heads are displaced in height with respect to each other corresponding to the position of the sound tracks of a dual-track tape.

References Cited in the file of this patent

UNITED STATES PATENTS

| | | |
|---|---|---|
| 2,089,287 | Molloy | Aug. 10, 1937 |
| 2,361,753 | Eilenberger | Oct. 31, 1944 |
| 2,702,835 | Camras | Feb. 22, 1955 |
| 2,747,024 | Sprosty | May 22, 1956 |
| 2,749,391 | Gumbert | June 5, 1956 |
| 2,793,253 | Howey | May 21, 1957 |
| 2,803,708 | Camras | Aug. 20, 1957 |

FOREIGN PATENTS

| | | |
|---|---|---|
| 1,103,470 | France | May 25, 1955 |